(12) United States Patent
Kakarala et al.

(10) Patent No.: US 7,092,578 B2
(45) Date of Patent: Aug. 15, 2006

(54) SIGNALING ADAPTIVE-QUANTIZATION MATRICES IN JPEG USING END-OF-BLOCK CODES

(75) Inventors: Ramakrishna Kakarala, Sunnyvale, CA (US); Jonathan S. Gibson, Aurora, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 976 days.

(21) Appl. No.: 10/001,508

(22) Filed: Oct. 23, 2001

(65) Prior Publication Data

US 2003/0091242 A1    May 15, 2003

(51) Int. Cl.
*G06K 9/36* (2006.01)
*H04N 1/32* (2006.01)

(52) U.S. Cl. .................. 382/251; 382/239; 382/246; 358/240.02

(58) Field of Classification Search ............... 382/239, 382/251, 246, 244, 232, 250, 248; 375/240.03, 375/240.07; 358/426.01, 426.02, 426.06, 358/426.07
See application file for complete search history.

(56) References Cited

U.S. PATENT DOCUMENTS

| | | | | |
|---|---|---|---|---|
| 5,157,488 A | | 10/1992 | Pennebaker | 358/133 |
| 5,535,013 A | * | 7/1996 | Murata | 382/239 |
| 5,570,203 A | * | 10/1996 | Suzuki et al. | 382/250 |
| 5,784,631 A | * | 7/1998 | Wise | 382/246 |
| 5,822,458 A | | 10/1998 | Silverstein et al. | 382/235 |
| 5,822,462 A | * | 10/1998 | Miyake | 382/251 |
| 5,841,551 A | * | 11/1998 | Nakatani et al. | 382/248 |
| 5,909,250 A | | 6/1999 | Hardiman | 348/405 |
| 5,926,223 A | | 7/1999 | Hardiman | 348/405 |
| 6,023,531 A | | 2/2000 | Peters | 382/232 |
| 6,072,836 A | | 6/2000 | Hardiman | 375/240 |
| 6,175,650 B1 | | 1/2001 | Sindhu et al. | 382/171 |
| 6,252,994 B1 | * | 6/2001 | Nafarieh | 382/253 |
| 6,266,375 B1 | * | 7/2001 | Chang et al. | 375/240.03 |
| 6,343,157 B1 | * | 1/2002 | Yada | 382/246 |
| 6,445,739 B1 | * | 9/2002 | Shen et al. | 375/240.03 |
| 6,724,817 B1 | * | 4/2004 | Simpson et al. | 375/240.07 |

FOREIGN PATENT DOCUMENTS

JP    08316846 A  *  11/1996

OTHER PUBLICATIONS

Gregory K. Wallace; *The JPEG Still Picture Compression Standard*; Submitted in Dec. 1991 for publication in IEEE Transactions on Consumer Electronics; pp. 1-17.

* cited by examiner

*Primary Examiner*—Wenpeng Chen (57) ABSTRACT

Previously-unused slots in a Huffman code table associated with a Joint Photographic Experts Group (JPEG) image file are associated with various quantization matrices (Q matrices) that are used to quantize data blocks of the JPEG image file. Huffman codes associated with the various Q matrices permit the particular Q matrix used to quantize a given data block to be signaled by a decoder as an end-of-block (EOB) code. The EOB codes and the Huffman code table are sent with the JPEG image file. Upon decoding of the image file, a standard JPEG decoder reads each of the EOB codes as a standard JPEG EOB code and does not vary the Q matrix. A modified decoder reads from each of the EOB codes which Q matrix was used to encode each particular data block of the image and uses that Q matrix to dequantize the data block.

27 Claims, 4 Drawing Sheets
(2 of 4 Drawing Sheet(s) Filed in Color)

SIGNALING ADAPTIVE-QUANTIZATION MATRICES IN JPEG USING END-OF-BLOCK CODES

BACKGROUND OF THE INVENTION

1. Technical Field of the Invention

The present invention relates in general to the field of adaptive quantization of digitized images, and in particular, to JPEG adaptive-quantization signaling.

2. Description of Related Art

The Joint Photographic Experts Group image-compression standard (JPEG) is used in many digital imaging systems. JPEG is the most widely-used method for still image compression. The most-commonly-used JPEG mode is referred to as the "baseline sequential mode." A less-commonly used mode of JPEG is the "progressive mode." A baseline-sequential JPEG file is stored as a single scan of an image. JPEG progressive mode divides the image into a series of scans. A first scan shows the image at an equivalent of a very low quality setting. Following scans gradually improve quality of the displayed image. Each scan adds to the data already provided so that the total storage requirement is roughly the same as for a baseline JPEG image of the same quality as the final scan. An advantage of progressive JPEG is that if an image is being viewed on-the-fly as it is transmitted, one can see an approximation of the whole image very quickly, with gradual improvement of quality as one waits longer. A disadvantage is that each scan takes about the same amount of computation to display as a whole baseline JPEG file would.

Various image compression-decompression techniques are used that compress a digitized image according to the JPEG baseline sequential mode. A drawback of the various known compression-decompression techniques used in conjunction with JPEG images is that at high compression ratios, data block boundaries of the image become visible in regions that should appear smooth, and, near edges, ringing appears in the image. It is understood that better data compression results can be achieved for high compression ratios by utilizing adaptive quantization techniques. "Adaptive quantization" refers to adaptively varying a quantization matrix (Q matrix) from data block to data block using an encoder.

While adaptive quantization helps to solve some of the problems discussed above, adaptive quantization cannot be used unless a mechanism for signaling the adaptation to the decoder is devised. The decoder must vary the Q matrix at each data block in exactly the same manner as the encoder in order to obtain the benefits of adaptive quantization.

A number of adaptive-quantization signaling schemes already exist. U.S. Pat. No. 5,157,488 to Pennebaker (Pennebaker) describes the use of an extra "color" component for signaling. Because JPEG can accommodate any number of components (red, green, blue, and possibly others), extra components can be sub-sampled by an integer factor relative to original components. A decoder that can interpret Pennebaker's signaling scheme can be programmed to recognize how the extra component signals a varying Q matrix. However, when separate systems are used for encoding and decoding an image, the decoding system can have a standard encoder rather than one that is "aware" of Pennebaker's signaling scheme. In such a case, the extra component would be decoded incorrectly, limiting the applicability of Pennebaker's approach.

U.S. Pat. No. 5,822,458 to Silverstein, et. al (Silverstein) discloses use of the parity of a sum of quantized DCT coefficients in each data block for signaling purposes. After the DCT coefficients are divided by the corresponding elements of the Q matrix, they are rounded to an integer value. Values having fractional portions near to 0.5 can be rounded either up or down without incurring significant additional error. For example, 11.499 can be rounded to either 11 or 12, the error being approximately the same in either case. Silverstein discloses taking the coefficient closest to the quantization midpoint and rounding the midpoint up or down so that the parity of the data block is even or odd. The parity therefore signals information that could be used for adaptive quantization.

Silverstein's signaling scheme requires a search of the 64 coefficients of each data block in order to determine the coefficient that is closest to the midpoint, which can result in slower encoding and increased computational load. In addition, if a coefficient with a fractional portion close to 0.5 cannot be found, rounding by amounts up to 1 might be required. In such cases, the rounding errors could result in less-than-desirable results.

What is needed is an adaptive-quantization signaling scheme that does not compromise image quality and retains compatibility with available decoding schemes.

SUMMARY OF THE INVENTION

The present invention provides for signaling JPEG adaptive-quantization matrices using end-of-block (EOB) codes. For example, EOB codes normally reserved for use in the less common progressive mode can be sued in the more-common baseline-sequential mode to identify respective quantization matrices. Thus, a method of JPEG adaptive quantization for image compression includes associating each of a plurality of quantization matrices (Q matrices) to a corresponding end-of-block (EOB) code of a plurality of EOB codes and performing a discrete cosine transform (DCT) of a digitized image file that includes a plurality of data blocks. The discrete-cosine-transformed digitized image file is quantized using at least two of the plurality of Q matrices. The EOB code that corresponds to the Q matrix used to quantize the discrete cosine transform of the at least one data block is included in the quantized discrete-cosine-transformed digitized image file for at least one of the data blocks.

A JPEG image-compression system includes a discrete-cosine-transform element. The discrete-cosine-transform element is adapted to perform a discrete-cosine transform of each data block of image data. The system also includes a quantizer adapted to quantize each discrete-cosine-transformed data block of the image data using a matrix selected from a plurality of Q matrices. The quantizer is also adapted to identify, for each discrete-cosine-transformed data block of the image data, which of the plurality of matrices was used to quantize the discrete-cosine-transformed data block of the image data.

A JPEG image file includes a Huffman-code table. The Huffman code table includes a plurality of EOB codes. Each of the EOB codes corresponds to a particular Q matrix. The image file also includes a plurality of data blocks. One of the plurality of EOB codes is included relative to each of the data blocks. The code included corresponds to the particular Q matrix used to quantize a discrete cosine transform of that data block.

A JPEG image compression-decompression system includes an encoder for encoding an image file. The encoder includes a quantizer. The quantizer is adapted to quantize the image file using a plurality of Q matrices. The image file includes a plurality of data blocks. An EOB code identifying which of the plurality of Q matrices was used to quantize a discrete cosine transform of that data block is associated with each data block. The image compression-decompression system also includes a decoder for decoding the image file. The decoder includes a dequantizer adapted to dequantize the image file using the plurality of Q matrices. The dequantizer reads, for each data block, the EOB code associated with that data block in order to determine which of the plurality of Q matrices was used to quantize the discrete cosine transform of that data block.

An article of manufacture for JPEG-image-compression adaptive quantization includes at least one computer-readable medium and processor instructions contained on the at least one computer-readable medium. The processor instructions are configured to be readable from the at least one computer-readable medium. The at least one processor reads the processor instructions. The instructions cause the at least one processor to operate to associate each of a plurality of Q matrices to a corresponding EOB code of a plurality of EOB codes. The processor instructions also cause the processor to operate to quantize a discrete cosine transform of each of a plurality of data blocks of an image file using at least two of the plurality of Q matrices. The processor instructions also cause the processor to operate to include in the image file, for at least one data block of the plurality of data blocks, the EOB code corresponding to the Q matrix used to quantize the discrete cosine transform of the at least one data block of the plurality of data blocks.

A decoder for decoding a JPEG image file includes a dequantizer adapted to dequantize the JPEG image file using a plurality of quantization matrices. The dequantizer reads, for each data block of a plurality of data blocks, an end-of-block code associated with that data block in order to determine which of a plurality of quantization matrices was used to quantize a discrete cosine transform of that data block.

The present invention provides the image-quality benefits of adaptive quantization in a JPEG context without the disadvantages of prior art adaptive-quantization systems. Specifically, the invention provides for compatibility with JPEG decoders that are not aware of the adaptive-decoding scheme, although the results are of lower quality than those achievable by a decoder in accordance with the invention. The signaling scheme is less computationally intensive than prior art schemes and requires no additional bandwidth. In contrast to Silverstein's signaling scheme, the present signaling scheme does not compromise image quality. Other advantages in addition to or instead of those above are provided by certain embodiments of the invention, which is better understood in the context of the description below with reference to the following drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A more complete understanding of embodiments of the present invention can be achieved by reference to the following Description when taken in conjunction with the accompanying Drawings wherein.

DETAILED DESCRIPTION OF THE PRESENTLY PREFERRED EXEMPLARY EMBODIMENTS OF THE PRESENT INVENTION

In the following Description, for purposes of explanation and not limitation, specific details, including details of the Joint Photographic Experts Group (JPEG) standard, are set forth in order to provide a thorough understanding of the present invention. However, it will be apparent to those of ordinary skill in the art that the present invention can be practiced in other embodiments that depart from these specific details. In other instances, detailed descriptions of well-known methods, devices, logical code (e.g., hardware, software, firmware), and the like are omitted so as not to obscure description of embodiments of the present invention with unnecessary detail. Preferred embodiments of the present invention and its advantages are best understood by referring to FIGS. 1–7 of the Drawings.

Figure 1:
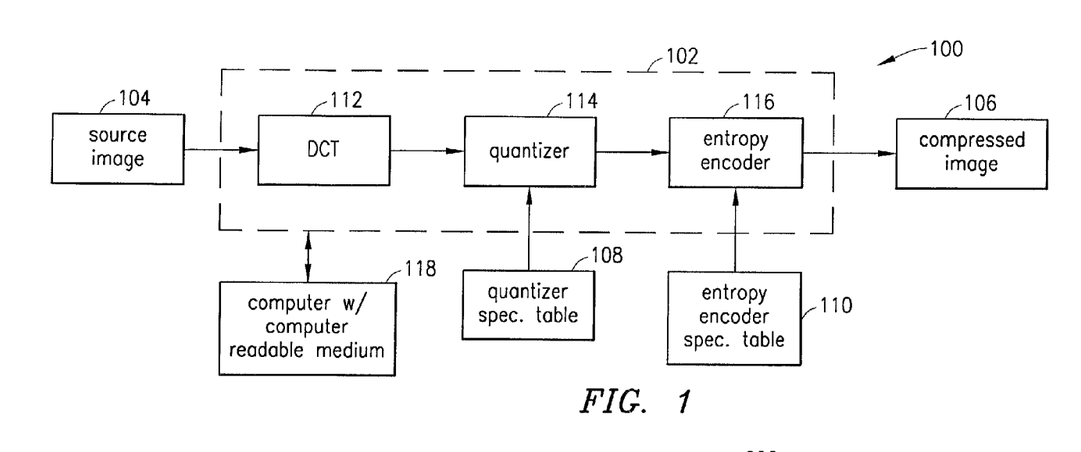
FIG. 1 is a block diagram of an image-compression system in accordance with teachings of the present invention.

FIG. 1 is a block diagram of an image-compression system 100. The system 100 can be used to compress a digitized image according to the JPEG baseline sequential mode and includes a discrete-cosine-transform-based (DCT-based) encoder 102, a quantizer-specifications table 108, and an entropy-encoder specifications table 110. The DCT-based encoder 102 includes a DCT element 112, a quantizer 114, and an entropy encoder 116. In the baseline sequential mode, the entropy encoder 116 comprises a Huffman encoder. The quantizer specifications table 108, entropy encoder specifications table 110, DCT element 112, quantizer 114, and entropy encoder 116 can be implemented as one or more software modules, as firmware, as hardware units, or any combination thereof.

A blocked source image 104 is input into the system 100. A source image may be one of the following: a grayscale image; a color image having three color components (e.g., red, green, blue); or a multi-component image having up to 255 components (i.e., a multi-band image). The source image, if a color image, is usually transformed into a luminance-chrominance component image (Y-Cb-Cr) and the chrominance components are sub-sampled by a factor of 2 to take advantage of the relative insensitivity of the human visual system to detail in the chrominance space. Following color-space transformation and sub-sampling, the source image typically comprises N parts.

Next, each of the N parts of the source image is divided into non-overlapping data blocks, usually of 8×8 pixels. The blocked source image 104, which represents a source image after the source image has been divided into data blocks, next undergoes a DCT, which is performed by the DCT element 112. The DCT performed by the DCT element 112 maps data of the image 104 from the spatial domain to the frequency domain. The DCT is calculated by the DCT element 112 for each data block of the image 104, resulting in a plurality of DCT coefficients for each data block. If the DCT coefficients of a given data block are designated D(i,j) (i,j=1, . . . , 8), the coefficient D(1, 1) is referred to as the DC coefficient and the remaining coefficients are referred to as the AC coefficients. The DC coefficient has zero frequency in both the i and the j dimensions, while the AC coefficients have increasing frequency as i and j increase.

Next, the DCT coefficients of the image 104 undergo quantization by the quantizer 114. The quantizer 114 performs a division operation of the DCT coefficients from the DCT element 112 by a set of weights commonly referred to as a quantization matrix (Q matrix). A different Q matrix can be used relative to each component. For DCT coefficients representing a given component, the Q matrix does not vary from data block to data block. A desired degree of compression can be achieved by appropriately scaling the Q matrix, which scaling is a global change for the entire image. There is a separate Q matrix for each component of the image 104 (e.g., Y, Cb, Cr). A typical Q matrix for the luminance component (i.e., Y) is shown in Table 1. In particular, the quantizer 114 quantizes the DCT coefficients of the image 104 by dividing each coefficient D(i,j) by the corresponding Q matrix entry of that coefficient and rounding to the nearest integer. The Q matrix can be obtained by the quantizer 114 from the quantizer-specifications table 108. In other words, the quantizer 114 quantizes the DCT coefficients of the image 104 by applying the equation:

$$D_q(i, j) = \text{round}\left[\frac{D(i, j)}{Q(i, j)}\right] \quad (1)$$

wherein Q(i,j) can be found in the quantizer-specifications table 108 and round represents rounding to the nearest integer.

TABLE 1

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 57 |
| 14 | 17 | 22 | 29 | 51 | 87 | 80 | 62 |
| 18 | 22 | 37 | 56 | 68 | 109 | 103 | 77 |
| 24 | 35 | 55 | 64 | 71 | 194 | 113 | 82 |
| 49 | 64 | 78 | 87 | 103 | 121 | 120 | 101 |
| 72 | 92 | 95 | 98 | 112 | 100 | 103 | 99 |

Q =

Next, the entropy encoder 116 encodes the quantized coefficients $D_q(i,j)$ of the image 104 from the quantizer 114 in order to minimize redundancy. The quantized DC coefficients are coded separately from the quantized AC coefficients because there is usually strong correlation between DC coefficients of adjacent data blocks. Before entropy encoding can be performed, zigzag scanning and run-length encoding of the quantized coefficients must be performed by the encoder 116.

Table 2 illustrates an exemplary matrix $D_q$. Table 3 illustrates the order of zigzag scanning of an exemplary matrix $D_q$. The entropy encoder 116 scans the matrix $D_q$ of Table 2 in a zigzag manner, starting with $D_q(1, 1)$, which serves to order the quantized coefficients by frequency. The zigzag scanning orders the quantized coefficients from least to greatest frequency.

TABLE 2

| | | | | | | | |
|---|---|---|---|---|---|---|---|
| 10 | 1 | 2 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 16 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Table 3 illustrates the order in which the coefficients of $D_q$ shown in Table 2 are zigzag scanned. According to Table 3, the coefficient of $D_q$ with value 2 as shown in Table 1 occupies the fifth position, the coefficient with value 10 occupies the zeroth position and the coefficient with value 16 occupies the 23rd position.

TABLE 3

| | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

After zigzag scanning, the AC coefficients are run-length encoded. As mentioned above, the DC coefficients are encoded separately from the AC coefficients. If $D_q$ is the 8×8 matrix shown in Table 2, the DC coefficient is 10 (i.e., $D_q(1,1)$). Run-length coding of the AC coefficients shown in Table 2 produces a sequence of pairs (R, V), wherein R represents the preceding number of zeros of the scan and V represents the value of the non-zero coefficient that follows the number of zeros.

Two special symbols are also allowed in a run-length-encoding sequence. The first symbol, ZRL, is used to designate a gap of 15 or more zeros after which the last non-zero coefficient of the sequence has not yet been reached. When the last non-zero coefficient of the scan is encountered, a second special symbol which indicates the end of the data block, end-of-block (EOB), is generated.

For $D_q$ as shown in Table 2, the run-length-code sequence is: (0,1),–(0, 1), (2,2), ZRL, (2,16), EOB. Because the coefficient with value 2 of $D_q$ as shown in Table 2 is in the fifth position of the scan and the coefficient with value 16 is in the 23rd position of the scan, there are 17 zeros between the two coefficients. The ZRL symbol of the run-length code sequence accounts for 15 of those zeros. The next entry in that sequence is (2, 16), which accounts for the remaining two zeros and the value 16. The EOB symbol indicates that the coefficient with value 16 is the last non-zero value of $D_q$.

After the run-length encoding, the entropy encoder 116 encodes each symbol of the run-length-code sequence using a predefined Huffman-code table, which table can be found by the entropy encoder 116 from the encoder-specifications table 110. In each (R, V) pair, the value of R lies between 0 and 15, and the value of V is grouped into 11 categories, wherein the categories, denoted S, are defined by the equation:

$$S=\lfloor \log_2(abs(V)) \rfloor + 1 \qquad (2)$$

wherein $\lfloor \; \rfloor$ denotes a floor function. V never equals zero, because V is always part of a run-length of zeros.

Next, the encoder 116 uses one of 256 possible Huffman codes to encode the pair (i.e., R,S). Following the Huffman encoding, an additional S bits are emitted to indicate the actual value of V within the category. For example, the (R, V) pair (12,−34) has R=12 and S=6. The Huffman code for (12,6) is emitted, followed by an additional 6 binary bits that indicate the value −34.

Figure 2:
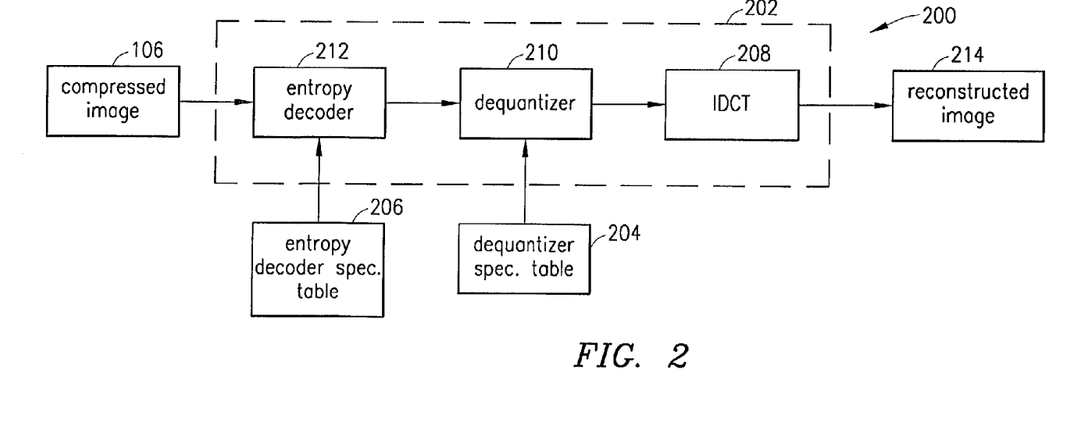
FIG. 2 is a block diagram of an image-decompression system in accordance with teachings of the present invention.

The output of the encoder 116 is a compressed image data 106. The compressed image data 106 can be decompressed using a JPEG-compliant decompression system that essentially performs the inverse of the functions described in connection with FIG. 1. An exemplary decompression system is shown in FIG. 2, which is discussed in more detail below.

The structure of the Huffman-code table used for baseline sequential JPEG is shown in Table 4. Table 4 shows that the EOB entry is found at (R,S)=(0,0), the ZRL entry is found at (R,S)=(15,0), and the entries (R, S) having S=0 and 0<R<15 are not used.

TABLE 4

|   |    | S            |   |   |     |   |    |
|---|----|--------------|---|---|-----|---|----|
|   |    | 0            | 1 | 2 | ... | 9 | 10 |
| R | 0  | code for EOB |   |   |     |   |    |
|   | 1  | Not used     |   |   |     |   |    |
|   | :  | Not used     | Codes for other values ||||
|   | 14 | Not used     |   |   |     |   |    |
|   | 15 | code for ZRL |   |   |     |   |    |

Each entry in Table 4 has a corresponding Huffman code. The Huffman codes are not shown herein, but can be found in W. B. Pennebaker and J. L. Mitchell, JPEG: Still image data compression standard, New York: Van Nostrand Reinhold, 1993, For example, the Huffman code for EOB might be 1010, and the Huffman code for ZRL might be 1111111110111. The Huffman codes can be optimized for each image using a JPEG-specified algorithm. A complete Huffman-code table is included with each image in a JPEG file header.

The entries of Table 4 for S=0 and R=1-14 are not used in the JPEG baseline sequential mode. They are reserved for a different JPEG mode known as progressive mode. The JPEG progressive mode is typically used in applications in which a low-resolution image is sent first and is followed by progressively higher-resolution images. The baseline sequential mode is by far the most-often-used JPEG mode.

It is understood that computer control with software can be utilized to aid in the operation of an embodiment of the present invention. A computer operating in accordance with instructions from a software store on a computer readable medium 118 aids the operation of the encoder 102 and the JPEG-image-compression adaptive-quantization process.

FIG. 2 is a block diagram of an image-decompression system 200. The system 200 can be used to decompress an image compressed by, for example, the system 100, according to the JPEG baseline sequential mode. The system 200 can be connected to the system 100 by, for example, a wireless or wired communications link (not shown), including, but not limited to, the Internet or an intranet. The system 200 includes a DCT-based decoder 202, a dequantizer-specifications table 204, and an entropy-encoder specifications table 206. The DCT-based decoder 202 includes an inverse discrete-cosine-transform (IDCT) element 208, a dequantizer 210, and an entropy decoder 212. In the baseline sequential mode, the entropy decoder 212 comprises a Huffman decoder.

The system 200 first decodes the compressed image data 106 by essentially performing the inverse of the entropy encoding performed by the entropy encoder 116; namely, Huffman decoding and run-length decoding. The entropy decoder 212 obtains the necessary Huffman code table specifications and run-length coding specifications from the entropy decoder specifications table 206.

Next, the compressed image data 106 is dequantized by the dequantizer 210, which essentially performs the inverse function of the quantizer 114. The dequantizer 210 obtains the Q matrix to be used during dequantization from the dequantizer specifications table 204. After dequantization of the compressed image data 106, an IDCT is performed by the IDCT element 208 on the compressed image data 106, which results in a reconstructed image 214. As described above, JPEG permits only one Q matrix to be used for each color component. Dequantizer specifications table 204, entropy decoder specifications table 206, IDCT element 208, dequantizer specifications table 204, entropy decoder specifications table 206, IDCT element 208 dequantizer 210, and entropy decoder 212 can be implemented as one or more software modules, as firmware, as hardware units, or any combination thereof.

A drawback of prior art compression-decompression schemes for JPEG images is that, at high compression ratios, data-block boundaries become visible in smooth regions and, in the neighborhood of edges, ringing occurs. It is understood that better results for the same compression ratio can be obtained by performing adaptive quantization. Adaptive quantization refers to adaptively varying by an encoder of a quantization (Q) matrix from data block to data block by, for example, quantizing more coarsely in regions where the result will not be noticeable and quantizing less coarsely in areas where the result will be.

The JPEG standard uses one Q matrix for the DCT coefficients representing each color component, which Q matrix does not vary from data block to data block within a component. It would be desirable to be able to vary the Q matrix and to signal the variation to a decoder using standard JPEG syntax. Embodiments of the present invention use the previously-unused slots of Table 4 shown above, in the S=0 column, for signaling. JPEG requires that only two of the 16 S=0 slots be used. Of the 16 S=0 slots, R=0 is used for an EOB code and R=15 is used for a ZRL code. Furthermore, in embodiments of the present invention, Huffman codes can be defined for one or more of the entries in the S=0 column for R=1-14. The Huffman codes so defined can be used to signal which of a plurality of Q matrices are to be used to decode individual data blocks of a JPEG image.

According to JPEG, baseline-sequential decoders are required to treat any code with S=0 and R=0-14 as the end of a data block (i.e., identically to the EOB code found at (R,S)=(0,0)). An EOB code can be signaled for any the following: S=0, R=0–14. Corresponding code words are defined in a Huffman code table (e.g., the Table 4). The Huffman code table, including any codes defined for S=0, R=1–14, is sent in a file header of the JPEG image. A standard JPEG decoder treats all of these codes as simply indicating an EOB. A Huffman code table according to an embodiment of the present invention is shown in Table 5.

TABLE 5

| | S | | | | | |
|---|---|---|---|---|---|---|
| | | 0 | 1 | 2 | ... 9 | 10 |
| R | 0 | code for EOB 0 | | | | |
| | 1 | code for EOB 1 | | Codes for other values | | |
| | : | : | | | | |
| | 14 | code for EOB 14 | | | | |
| | 15 | code for ZRL | | | | |

An advantage of having a total of 2–15 different codes for EOB is that an encoder can signal to a modified decoder to use of any one of 2–15 different specified Q matrices at each data block by choosing an EOB code for each Q matrix. A standard decoder treats all of these codes the same (i.e., merely as an EOB) and will therefore not vary the Q matrix.

Embodiments of the present invention are not difficult to implement in either an encoder or a modified decoder, since unused slots in an already-existing table are filled in. The Huffman-code table is sent along with the image file to the decoder, as required by JPEG. A modified decoder reads the EOB code and uses the appropriate Q matrix to perform the inverse quantization.

It is known that JPEG compression can result in at least two types of blocking artifacts: 1) visible boundaries between data blocks; and 2) ringing appears in the neighborhood of data-block edges. If a given Q matrix produces both types of artifacts, one way to reduce blocking artifacts is to use adaptive quantization. For smooth data blocks, a smaller Q matrix, such as, for example, 0.75 Q, can be used, meaning that quantization error is reduced, and for data blocks containing edges, a larger Q matrix, such as, for example, 1.25 Q, can be used. More bits are allocated to smooth data blocks to avoid blocking artifacts, and the fewer bits are allocated to the edge data blocks. By adjusting the scaling of both Q matrices, an adaptively-compressed image will require approximately the same file size as with standard compression.

In an embodiment of the present invention, the adaptation of the Q matrix can be signaled by using two EOB codes, one for the smooth data blocks, and the other for the edge data blocks. The determination of whether the data block is a smooth or an edge data block is based on whether the last non-zero coefficient occurs early or late in a zigzag scan relative to a pre-determined threshold.

Figure 3:
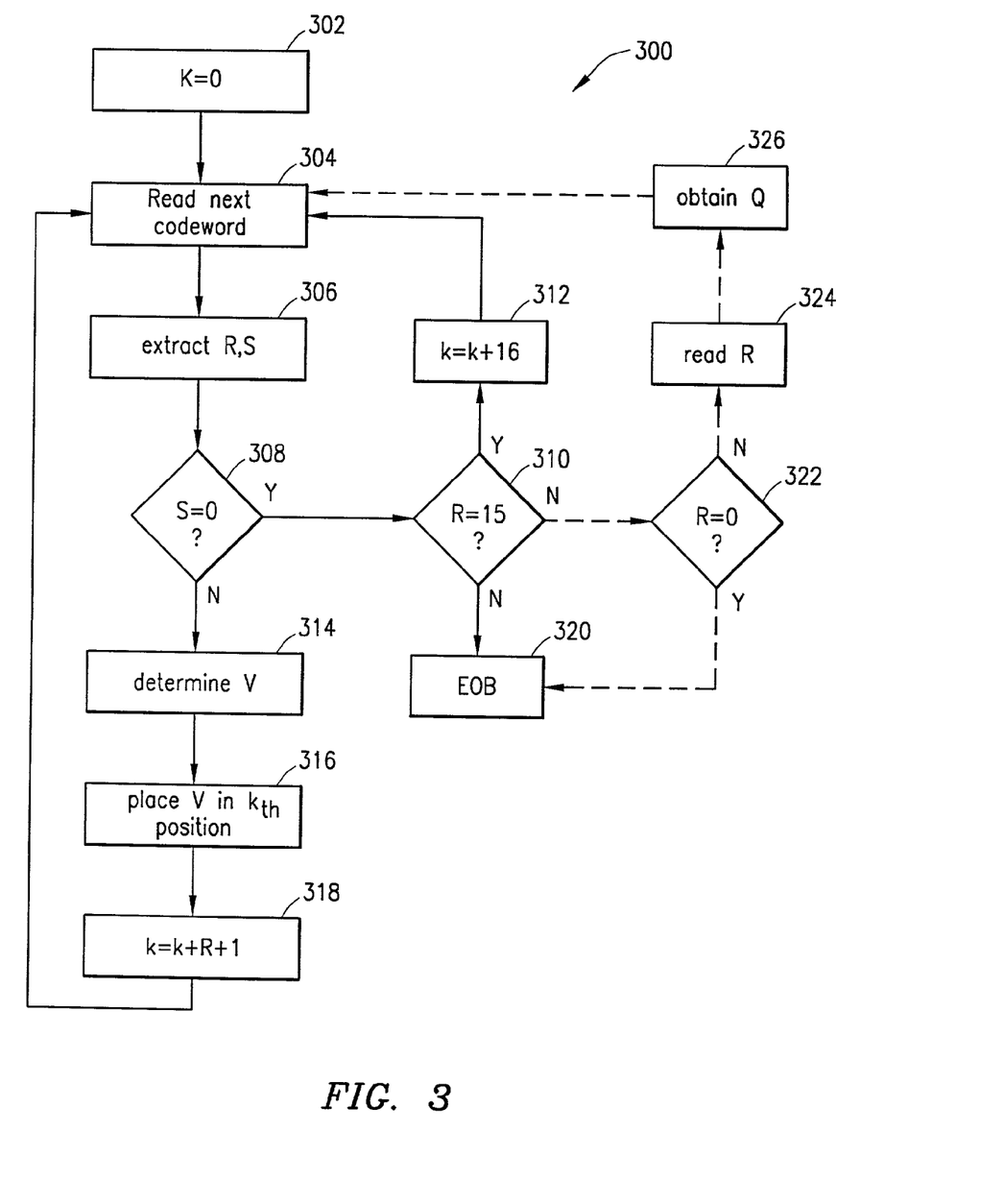
FIG. 3 is a flow chart illustrating decoding of an image encoded using varying Q matrices and placing entries of a data block thereof into a kth position in a buffer of decoded coefficients by both a standard decoder and by a decoder adapted to operate according to the present invention.

FIG. 3 is a flow chart illustrating an embodiment of the present invention for decoding of an image encoded using varying Q matrices and placing entries of a data block thereof into a kth position in a buffer of decoded coefficients by both a standard decoder and by a decoder according to an embodiment of the present invention. For purposes of FIG. 3, k=0–63 refers to a position in a zigzag scan of a data block as shown in Table 2. A flow 300 can be implemented as one or more software modules, as firmware, as hardware units, or any combination thereof. In a preferred embodiment, the flow 300 is implemented by the system 200.

The flow 300 begins at step 302, wherein k=0, wherein k represents a position in the zigzag scan of the data block. At step 304, a codeword that corresponds to the kth position is read from a Huffman code table. At step 306, R and S are extracted from the codeword. At step 308, a determination is made whether S=0. If it is determined at step 308 that S=0, execution proceeds to step 310. At step 310, a determination is made whether R=15. If it is determined at step 310 that R=15, this means that a ZRL code has been reached, and execution proceeds to step 312. At step 312, k is incremented by 16 positions so that the next codeword, which corresponds to k=k+16, can be read. From step 312, execution moves to step 304, at which step the codeword that corresponds to k=k+16 is read.

If, at step 308, it is not determined that S=0, execution moves to step 314. At step 314, a V value is determined from the value of S. At step 316, V is placed in the kth position. At step 318, k is incremented by R+1 positions. From step 318, execution moves to step 304, at which step the next codeword is read. If, at step 310, it is not determined that R=15, a standard JPEG decoder proceeds to step 320. At step 320, the end of the data block is considered to have been reached, since any value of S=0 and R=0-14 is read by a standard decoder as an EOB code.

If at step 310, it is not determined that R=15, a JPEG decoder adapted to operate according to the present invention (i.e., a modified decoder) proceeds to step 322 rather than to step 320. Operations of the modified decoder that vary from operation of the standard decoder are denoted by dashed lines. At step 322, a determination is made whether R=0. If it is determined at step 322 that R=0, execution proceeds to step 320, since R,S=(0,0) corresponds to an EOB code. If it is not so determined, execution proceeds to step 324. At step 324, the R value of the codeword is read. At step 326, a Q matrix corresponding to the R value that is used to decode the data block is obtained. In a preferred embodiment, the decoder accesses an index of Q matrices as a function of R in order to obtain the proper Q matrix. From step 326, execution moves to step 304, at which step the next codeword is read.

It is assumed for purposes of the flow 300 that a Q matrix has been specified for each of S=0, R=0–14. However, as will be apparent to those skilled in the art, a Q matrix need not be specified for each of S=0, R=0–14. As few as two and as many as 15 Q matrices can be used in accordance with embodiments of the present invention. If fewer than 15 Q matrices are used, well-understood modifications can be made to the flow 300.

Figure 4:
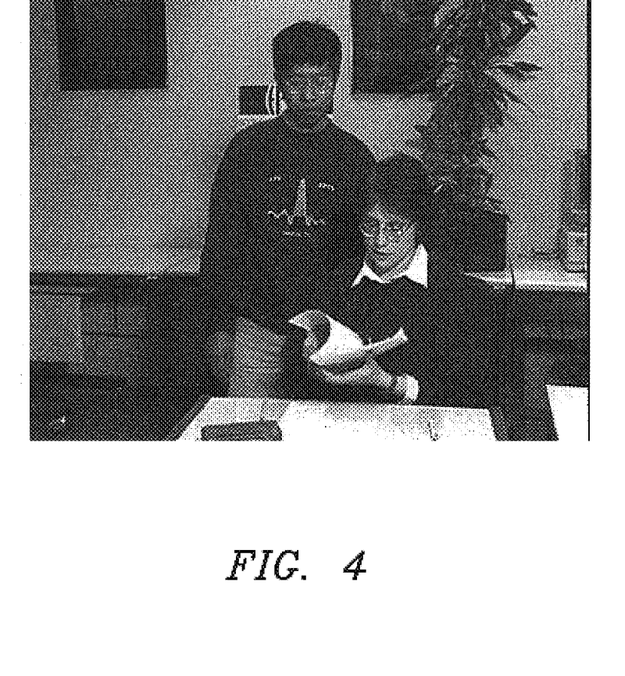
FIG. 4 is a color image prior to compression.
Figure 5:
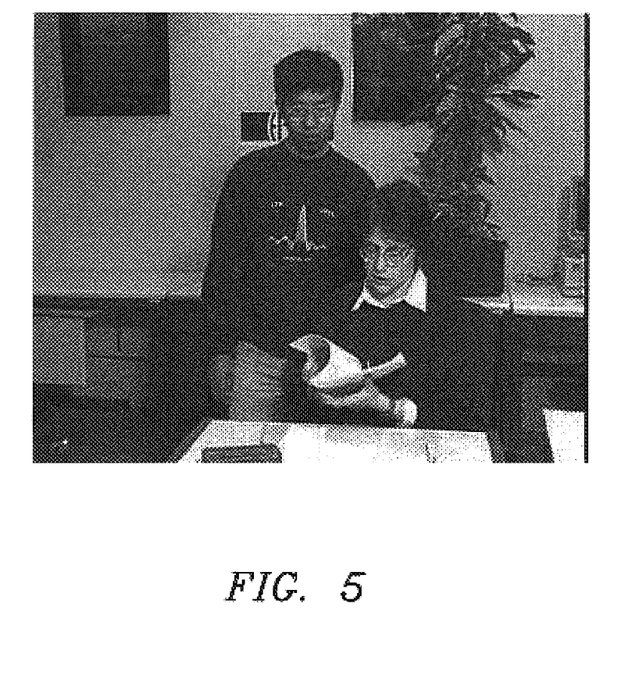
FIG. 5 is a color image that results from standard JPEG compression with a compression ratio of 25:1 of the image of FIG. 4.
Figure 6:
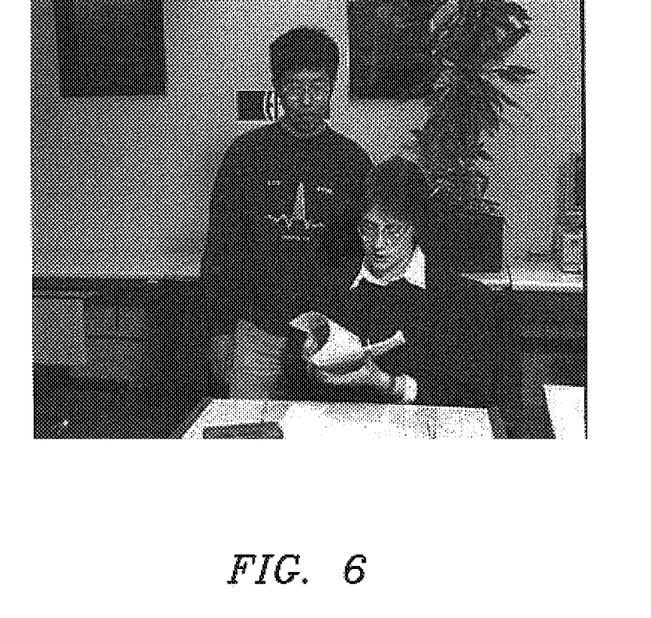
FIG. 6 is a color image that results from the image of FIG. 4 being compressed using adaptive quantization, being signaled using EOB codes, and being decompressed using a modified decoder.
Figure 7:
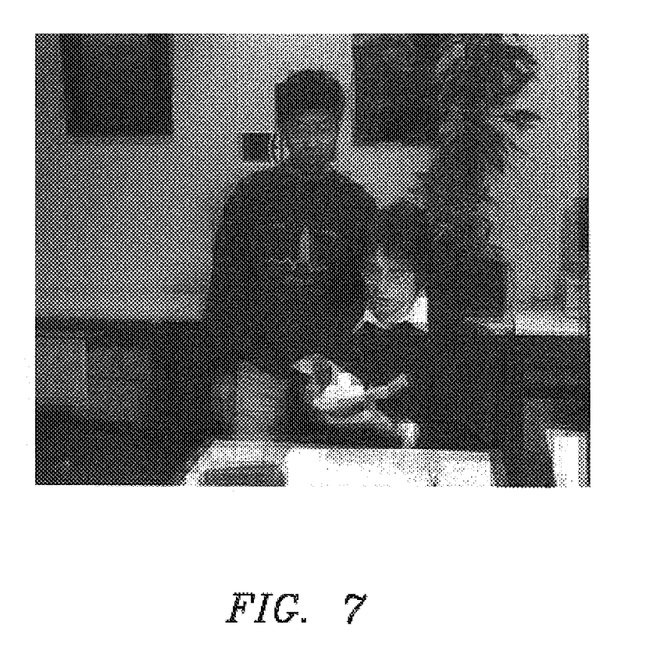
FIG. 7 is a color image that results from the image of FIG. 4 being compressed using the same adaptive quantization and signaling as FIG. 6, but being decompressed by a standard decoder.

FIGS. 4, 5, 6, and 7 are color images in accordance with embodiments of the present invention. FIG. 4 is an color image prior to compression. FIG. 5 is a color image that results from standard JPEG compression with a compression ratio of 25:1 of the image. FIG. 6 is a color image that results from the image of FIG. 4 being compressed using adaptive quantization, being signaled using EOB codes, and being decompressed using a modified decoder in accordance with an embodiment of the present invention. FIG. 7 is a color image that results from the image being compressed using the same adaptive quantization and signaling as FIG. 6, but being decompressed by a standard decoder.

An adaptively-quantized image can be read by a standard decoder, although the result will not be as true to the original, uncompressed image, as if a standard, non-adaptively-quantized, JPEG image had been sent to the same decoder, because the standard decoder cannot vary the Q matrix used to decode the image to correspond to the Q matrix used to encode the image. Therefore, the adaptively-quantized image that has been decoded by a standard decoder (e.g., FIG. 7) is less sharp in edge regions that if it were decoded by a modified decoder (e.g., FIG. 6), although the adaptively-quantized image is quite clear in smooth regions.

The best result in terms of reduced blocking artifacts is obtained when an adaptively-quantized image is decoded by a modified decoder, as shown by FIG. 6. Thus, the fidelity of the image of FIG. 6 is better than that of the image of FIG. 5 relative to the image of FIG. 4 in terms of reduced blocking artifacts in edge regions. However, the images of both FIG. 5 and FIG. 6 possess greater fidelity relative to the uncompressed image of FIG. 4 than does the image of FIG. 7.

Although embodiment(s) of the present invention have been illustrated in the accompanying Drawings and described in the foregoing Description, it will be understood that the present invention is not limited to the embodiment(s) disclosed, but is capable of numerous rearrangements, modifications, and substitutions without departing from the invention defined by the following claims.

We claim:

1. A method of Joint Photographic Experts Group (JPEG) adaptive quantization for image compression, the method comprising:
    associating each of a plurality of quantization matrices to a corresponding end-of-block code for a plurality of end-of-block codes;
    performing a discrete cosine transform of a digitized image file comprising a plurality of data blocks;
    quantizing the discrete-cosine-transformed digitized image file using at least two of the plurality of quantization matrices; and
    including in the quantized discrete-cosine-transformed digitized image file, for at least one of the data blocks, the end-of-block code corresponding to the quantization matrix used to quantize the discrete-cosine-transformed digitized image file of the at least one data block.

2. The method of claim 1 wherein the plurality of end-of-block codes are included in a Huffman code table.

3. The method of claim 2 further comprising including the Huffman code table in a header of the file.

4. The method of claim 3 further comprising
    reading, for the at least one data block, the end-of-block code corresponding to the quantization matrix used to quantize the discrete-cosine transformed digitized image file of the at least one data block;
    obtaining, for the at least one data block, the quantization matrix used to quantize the discrete-cosine-transformed digitized image file of the at least one data block; and
    dequantizing the at least one data block using the quantization matrix used to quantize the discrete-cosine-transformed digitized image file of the at least one data block.

5. The method of claim 3 further comprising:
    reading, for the at least one data block, the end-of-block code corresponding to the quantization matrix used to quantize the discrete-cosine-transformed digitized image file of the at least one data block; and
    dequantizing the at least one data block using a standard JPEG quantization matrix irrespective of the quantization matrix used to quantize the discrete-cosine-transformed digitized image file of the at least one data block.

6. The method of claim 1 wherein the method operates according to JPEG baseline sequential mode.

7. A JPEG-image-compression system comprising:
    a discrete-cosine-transform element adapted to perform a discrete cosine transform of each data block of image data; and
    a quantizer adapted to:
        quantize each discrete-cosine transformed data block of the image data using a matrix selected from a plurality of quantization matrices; and
        identify, for each discrete-cosine-transformed data block of the image data, which of the plurality of matrices was used to quantize the discrete-cosine-transformed data block of the image data; and
    wherein the quantizer generates an identification including, in the quantized discrete-cosine-transformed image data, an end-of-block code associated with the matrix used to quantize the discrete-cosine-transformed data block.

8. The system of claim 7 wherein the end-of-block code is included in a Huffman code table.

9. The system of claim 8 wherein a Huffman code table comprising a plurality of codes associated with a plurality of matrices is included in a header of the image data.

10. The system of claim 7 wherein the system operates according to JPEG baseline sequential mode.

11. An image compression-decompression system comprising:
    an encoder for encoding a JPEG image file, the encoder including a quantizer adapted to quantize the JPEG image file using a plurality of quantization matrices, wherein the JPEG image file includes a plurality of data blocks and associated with each data block is an end-of-block code identifying which of the plurality of quantization matrices was used to quantize discrete-cosine-transformed digitized image data of that data block; and
    a decoder for decoding the JPEG image file, the decoder including a dequantizer adapted to dequantize the JPEG image file using the plurality of quantization matrices, wherein the dequantizer reads, for each data block, the end-of-block code associated with that data block in order to determine which of the plurality of quantization matrices was used to quantize the discrete-cosine-transformed digitized image data of that data block.

12. The system of claim 11 wherein the encoder and decoder operate according to JPEG baseline sequential mode.

13. The system of claim 11 wherein a Huffman-code table comprising a plurality of codes associated with the plurality of matrices is included in a header of the image file.

14. The system of claim 11 wherein the end-of-block codes are included in a Huffman-code table.

15. An article of manufacture for JPEG-image-compression adaptive quantization, the article of manufacture comprising:
    at least one computer-readable medium; and
    processor instructions contained on the at least one computer-readable medium, the processor instructions configured to be readable from the at least one computer-readable medium by at least one processor to thereby cause the at least one processor to operate to:
        associate each of a plurality of quantization matrices to a corresponding end-of-block code for a plurality of end-of-block codes;

quantize discrete-cosine-transformed digitized image data of each of a plurality of data blocks of an image file using at least two of the plurality of quantization matrices; and include in the image file, for at least one data block of the plurality of data blocks, the end-of-block code corresponding to the quantization matrix used to quantize the discrete-cosine-transformed digitized image data of the at least one data block of the plurality of data blocks.

16. The article of claim 15 wherein the plurality of end-of-block codes are included in a Huffman code table.

17. The article of claim 16 wherein the processor further operates to include, in a header of the image file, the Huffman code table.

18. The article of claim 17 wherein the processor further operates to:

read, for the at least one data block, the end-of-block code corresponding to the quantization matrix used to quantize the discrete-cosine-transformed digitized image data of the at least one data block;

obtain, for the at least one data block, the quantization matrix used to quantize the discrete-cosine-transformed digitized image data of the at least one data block; and dequantize the at least one data block using the quantization matrix used to quantize the discrete-cosine-transformed digitized image data of the at least one data block.

19. The article of claim 15 wherein the processor operates according to JPEG baseline sequential mode.

20. A decoder for decoding a JPEG image file, the decoder comprising:

a dequantizer adapted to dequantize the JPEG image file using a plurality of quantization matrices; and wherein the dequantizer reads, for each data block of a plurality of data blocks, an end-of-block code associated with that data block in order to determine which of a plurality of quantization matrices was used to quantize discrete-cosine-transformed digitized image data of that data block.

21. The decoder of claim 20 wherein the end-of-block codes are included in a Huffman code table.

22. The decoder of claim 20 wherein the decoder operates according to JPEG baseline sequential mode.

23. The decoder of claim 20 wherein a Huffman code table comprising a plurality of codes associated with the plurality of matrices is included in a header of the image file.

24. A method for decoding a JPEG image file, comprising:

reading, for each data block of a plurality of data blocks, an end-of-block code associated with that data block in order to determine which of a plurality of quantization matrices was used to quantize discrete-cosine-transformed digitized image data of that data block; and dequantizing a plurality of the data blocks of the JPEG image file using the quantization matrix of the plurality of quantization matrices used to quantize that data block.

25. The method of claim 24 wherein the end-of-block codes are included in a Huffman code table.

26. The method of claim 24 operating according to JPEG baseline sequential mode.

27. The method of claim 24 wherein a Huffman code table comprising a plurality of codes associated with the plurality of matrices is included in a header of the image file.

* * * * *

UNITED STATES PATENT AND TRADEMARK OFFICE
CERTIFICATE OF CORRECTION

| | |
|---|---|
| PATENT NO. | : 7,092,578 B2 |
| APPLICATION NO. | : 10/001508 |
| DATED | : August 15, 2006 |
| INVENTOR(S) | : Kakarala et al. |

Page 1 of 1

It is certified that error appears in the above-identified patent and that said Letters Patent is hereby corrected as shown below:

On the Title page, in field (56), under "Foreign Patent Documents", in column 2, line 1, after "11/1996" insert -- H03M 07/42 --.

Signed and Sealed this

Twentieth Day of November, 2007

JON W. DUDAS
*Director of the United States Patent and Trademark Office*